(12) United States Patent
Schumacher et al.

(10) Patent No.: US 8,806,845 B2
(45) Date of Patent: Aug. 19, 2014

(54) MOWING FINGER ARRANGEMENT

(75) Inventors: Gustav Schumacher, Eichelhardt (DE); Friedrich-Wilhelm Schumacher, Birnbach (DE)

(73) Assignee: Gebr. Schumacher Geratebaugesellschaft mbH, Eichelhardt (DE)

( * ) Notice: Subject to any disclaimer, the term of this patent is extended or adjusted under 35 U.S.C. 154(b) by 0 days.

(21) Appl. No.: 13/049,938

(22) Filed: Mar. 17, 2011

(65) Prior Publication Data

US 2011/0225941 A1 Sep. 22, 2011

(30) Foreign Application Priority Data

Mar. 18, 2010 (DE) .......... 10 2010 011 941

(51) Int. Cl.
*A01D 34/18* (2006.01)

(52) U.S. Cl.
USPC .......................................... 56/298

(58) Field of Classification Search
USPC ............................... 56/298, 313, 303
See application file for complete search history.

(56) References Cited

U.S. PATENT DOCUMENTS

| | | | | |
|---|---|---|---|---|
| 1,538,282 A | * | 5/1925 | Fry | 56/311 |
| 1,583,167 A | * | 5/1926 | Pehrson | 56/305 |
| 3,151,434 A | * | 10/1964 | Hamel | 56/296 |
| 3,553,948 A | * | 1/1971 | White | 56/307 |
| 3,699,758 A | | 10/1972 | Scarnato et al. | |
| 4,286,425 A | * | 9/1981 | Schumacher et al. | 56/307 |
| 4,750,321 A | * | 6/1988 | Klein | 56/310 |
| 4,909,026 A | * | 3/1990 | Molzahn et al. | 56/298 |
| 5,077,962 A | | 1/1992 | Schumacher, II et al. | |
| 5,343,682 A | * | 9/1994 | Puncochar | 56/305 |
| 5,979,152 A | * | 11/1999 | McCredie | 56/298 |
| 6,250,057 B1 | | 6/2001 | Schumacher et al. | |
| 6,305,154 B1 | | 10/2001 | Yang et al. | |
| 7,313,903 B2 | * | 1/2008 | Schumacher et al. | 56/304 |
| 2006/0150607 A1 | | 7/2006 | Schumacher et al. | |

FOREIGN PATENT DOCUMENTS

| | | |
|---|---|---|
| DE | 29 45 960 | 5/1981 |
| DE | 198 50 261 A1 | 5/2000 |
| EP | 0 875 134 | 11/1998 |
| EP | 1 551 214 B1 | 7/2005 |
| RU | 2298310 | 5/2007 |
| WO | WO 2004/032602 | 4/2004 |

* cited by examiner

*Primary Examiner* — Thomas B Will
*Assistant Examiner* — Mai Nguyen
(74) *Attorney, Agent, or Firm* — Harness, Dickey & Pierce, P.L.C.

(57) ABSTRACT

A mowing finger arrangement and mowing bar for finger bar mowers of a harvester, as well as a method for manufacturing mowing fingers has an upper and lower element connected together to form at least one mowing finger. The mowing finger arrangement serves to guide a mowing sickle and forms counter cutting edges for the sickle blades arranged on the mowing sickle. An abutment on the upper element delimits upward movement of the mowing sickle when a downward force is exerted on the face end of the sickle blades.

14 Claims, 4 Drawing Sheets

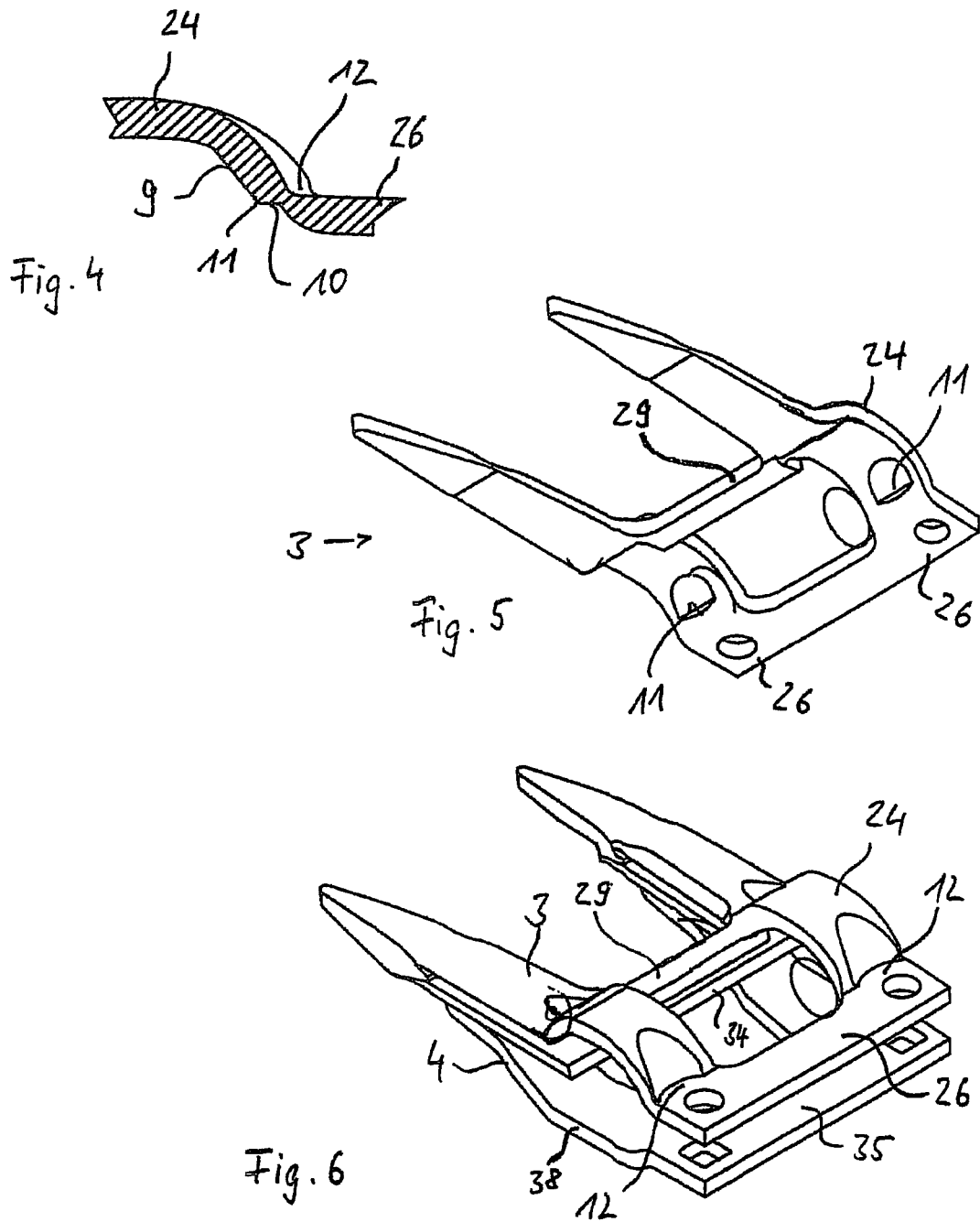

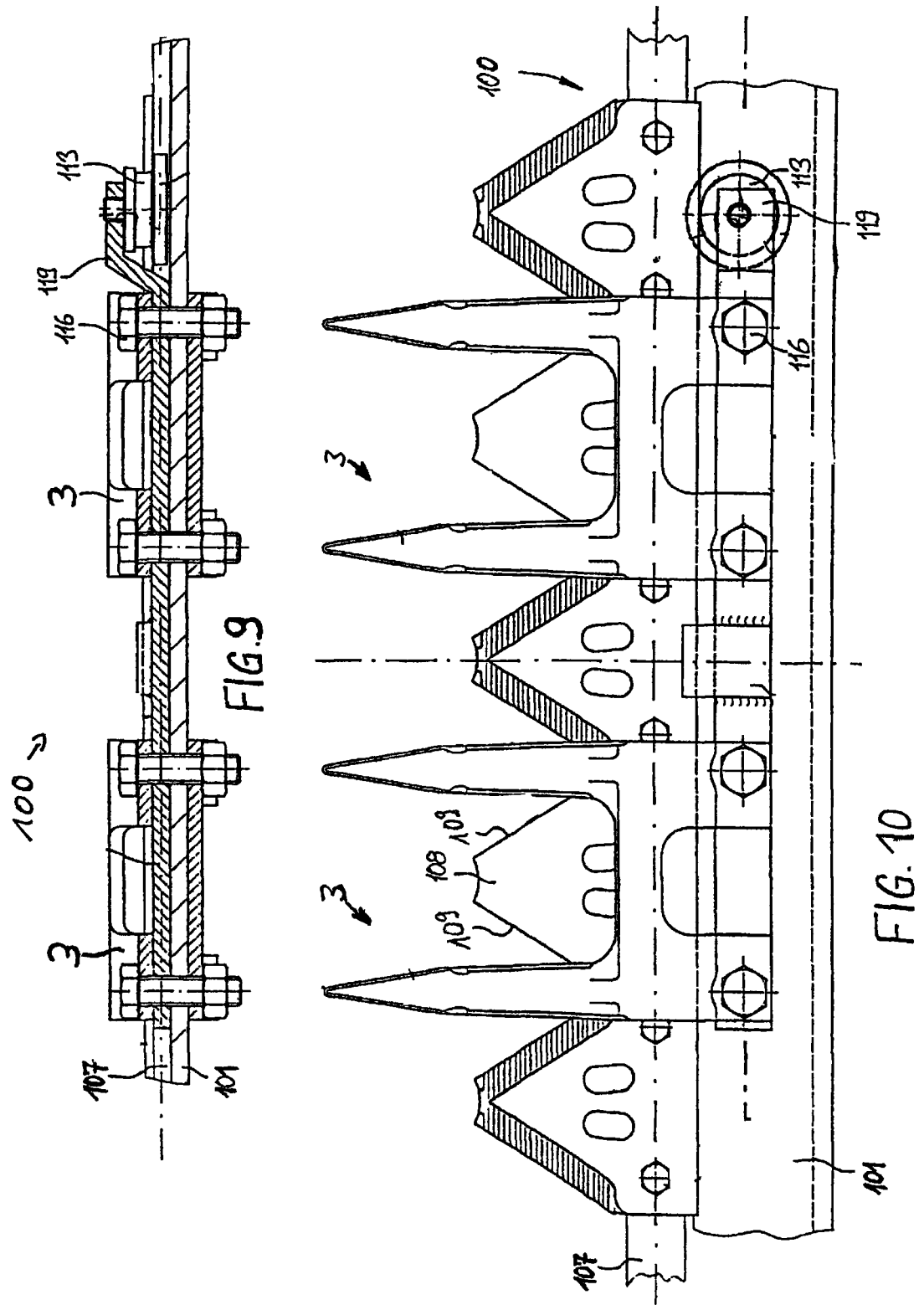

MOWING FINGER ARRANGEMENT

CROSS-REFERENCE TO RELATED APPLICATION

This application claims priority to German Patent Application No. 102010011941.5-23, filed Mar. 18, 2010, which application is herein expressly incorporated by reference.

FIELD

The disclosure relates to a mowing finger arrangement and, more particularly, to a mowing bar for harvesters finger bar mowers, as well as a method for manufacturing the mowing fingers. The mowing finger arrangement serves to guide a mowing sickle and form counter cutting edges for the cutting blades arranged on the mowing sickle.

BACKGROUND

Mowing bars generally comprise a finger bar with several arranged mowing fingers. A mowing sickle is reciprocatingly guided relative to the finger bar. The sickle comprises a sickle bar with several mounted sickle blades. The sickle blades form cutting edges that interact with counter cutting edges that are formed by the mowing fingers.

Sickle blades generally have a triangular base shape. During the cutting process, the harvesting goods are pressed, by reciprocating movement of the sickle blades of the mowing sickle, against the mowing fingers and cut. During such a scissor-like cutting process, each individual sickle blade is pushed backwards by the cutting load, when viewed in a working direction. In order to hold the mowing sickle in its position relative to the finger bar, a supporting guidance of the mowing sickle relative to the finger bar is necessary. Such a guide is shown in publication number DE 198 50 261 A1. Here, on the mowing bar, a sheet metal guide, that forms a guide face, extends in a direction of the movement direction of the mowing sickle. The sheet metal guide faces the mowing sickle and is mounted on the finger bar. The mowing sickle is supported, when viewed in the working direction, to the rear with the sickle bar on the guide face of the sheet metal guide. While the sickle bar is reciprocatingly moved, the sheet metal guide is rigidly mounted on the finger bar. The mowing sickle is pushed independently of the cutting force more or less strongly against the sheet metal guide. The cutting force can greatly increase due to the difficulty of cutting the harvesting goods or due to blunt sickle blades. Thus, increased frictional forces act between the sickle bar and the sheet metal guide. This leads to large wear on the sickle bar and on the sheet metal guide. Furthermore, besides the driving energy, that is necessary to cut the harvesting goods, a large portion of the driving energy is necessary for the reciprocating movement of the mowing sickle. The necessary driving energy for the movement of the mowing sickle is often higher than the necessary driving energy for the cutting process.

According to European Patent No. EP 1 551 214 B1, frictional force is reduced by a roller guide. The roller holders, in the form of a bridge between, respectively, two mowing fingers, offer a stable support of the rollers and ensure a passing-through of dirt. No frictional resistance has to be overcome between the mowing sickle and the finger bar. Only the rolling friction of the rollers has to be overcome, which is a distinctly smaller amount. The rollers can be formed with circumferentially extending collars that reduce tipping of the mowing sickle by the cutting forces. The mowing sickle can still be deformed between the rollers, in so far as it is not guided by a mowing finger. Especially, when using double mowing fingers, no roller is mounted in the intermediate space, thus it can be deformed. If the sickle blades enter against a mowing finger, a large friction is produced between the cutting edge of the mowing finger and the sickle blade, which leads to large wear.

SUMMARY

It is an object of the disclosure to improve the guide of the mowing sickle in the area of the mowing finger without increasing the friction at a harvesting situation with low loading of the mower.

The object is solved by a mowing finger arrangement comprising an upper element that is connectable to form at least one mowing finger of a lower element. A blade gap guides a mowing sickle between the lower element and the upper element. The direction, in which a mower is moved relative to the harvesting goods, is designated as the working direction. The upper element has a projection on a side facing the lower element and, in the assembled condition, on the side facing the mowing sickle. The projection is an abutment for a rear portion of the mowing sickle, when viewed in the working direction.

An advantage of the mowing finger arrangement is that the projection serves to guide the mowing sickle. Thus, a tilting of the mowing sickle is prevented by the projection. The projection is arranged in the area of the mowing finger and is distanced to the roller-like or other supports or retainers for the mowing sickle. The rear portion of the mowing sickle is the part of the mowing sickle that is understood to be arranged, in the working direction, behind an attachment of the sickle blade on a sickle bar. If the sickle blade is bent over by the harvesting goods, this takes place in a direction towards the ground. The rear portion is deflected upwards in an opposite direction. However, this defection is prevented by the abutment, in the form of the projection, on the upper element of the mowing finger. The abutment, delimiting the deflection, has the advantage that it does not contact the mowing sickle at low loads of the mower and, thus, the friction is not increased.

Preferably, the rear portion of the mowing sickle, when viewed in the working direction, is supported by the projection in an upward direction towards the upper element in the assembled condition. Thus, tilting of the sickle blade downwards is advantageously prevented.

According to a preferred embodiment, the projection is formed by an impression in the upper element on a side facing away from the mowing sickle. A rear web of the upper element is arranged on a rear end of the at least one mowing finger. When viewed in the working direction, the rear web of the upper element serves to attach the mowing finger arrangement on a finger bar. The projection is arranged, when viewed in the working direction, in front of the rear web. At least one topside bulge is preferably arranged in front of the rear web. The at least one topside bulge has the projection on a concave face facing the mowing sickle in the assembled condition. A concave and convex designation, in the sense of the disclosure, is only for a main direction of the bulge and represents no limitation concerning the shape or configuration of the bulge.

The projection on the concave side of the bulge can be manufactured by suitable measures. The projection is formed by an impression in the topside bulge from a convex side facing away from the mowing sickle in the assembled condition. The impression can be made separately on the already produced upper element, or it can be formed by a corresponding modified embossing shape during the actual manufacture of the upper element by means of deformation, in one working step.

The rear web of the upper element has an attachment bore. The impression is arranged in an area of the topside bulge facing the attachment bore. The impression can be used simultaneously to provide a free area around the attachment bore, which is necessary when attaching the mowing finger arrangement by a screw head or a screw nut. Thus, two forming tasks are advantageously solved at the same time.

The mowing finger arrangement can have one or several mowing fingers. Preferably, the upper element and the lower element form two mowing fingers. The rear web of the upper element is formed as the rear connection web of the upper element. The two mowing fingers are connected to each other via the rear connection web and a front connection web on the upper element as well as via a rear connection web and a front connection web on the lower element. This double finger arrangement is, compared to a single mowing finger, advantageously stable and at the same time lighter than arrangements with three or even more mowing fingers.

The rear connection web of the lower element serves to attach the mowing finger arrangement on a finger bar. The lower element has a first mowing sickle support on a first of the two mowing fingers and a second mowing sickle support on a second of the two mowing fingers. The two mowing sickle supports are connected to each other via the front connection web of the lower element. The front connection web of the lower element forms a third mowing sickle support. Preferably, the first and the second mowing sickle support form, respectively, two lower counter cutting edges.

The upper element has a first mowing sickle support on a first of the two mowing fingers and a second mowing sickle support on a second of the two mowing fingers. The two mowing sickle supports are connected to each other via the front connection web of the upper element. The front connection web of the upper element forms a third mowing sickle support. The first and the second mowing sickle supports form, respectively, two upper counter cutting edges.

The mowing sickle supports of the lower element and the mowing sickle supports of the upper element form the blade gap.

The upper element is formed flat in the area of the first and the second mowing sickle support. The topside bulges start, when viewed in working direction, in front of a rear edge of the front connection web. The connection webs of the upper element and the topside bulges form an opening that partially extends into the rear connection web. The lower element has a support plate that forms the mowing sickle supports. The lower element has a carrier that is connected to the support plate. The carrier includes the rear connection web of the lower element.

Attachment through holes are provided in the rear connection web of the lower element. The through holes attached the mowing finger arrangement onto a sickle bar, which has a cross-section, deviating from a circle.

A method of manufacturing a mowing finger comprises the steps of embossing an upper element and forming a projection on the upper element directed towards a lower element. The projection performs as an abutment for a rear portion of a mowing sickle, when viewed in working direction. Connecting the upper element to the lower element.

The projection serves as an abutment for a rear portion of a mowing sickle. Thus, this advantageously prevents tilting of the mowing sickle, as described above. The projection can be easily formed during the manufacture of the upper element, preferably, in one working step with embossing the upper element. The projection is formed by an impression on a side of the upper element facing away from the lower element.

A rear web is formed on a rear end of the mowing finger during the embossing of the upper element when viewed in the working direction. A topside bulge is arranged in front of the rear web. The projection is formed in a concave side of the bulge.

The projection is manufactured by an impression in a convex side of the topside bulge. The impression provides a space around an attachment bore of the rear web. The space enables the arrangement of a screw head or a screw nut in the area of the attachment bore.

A mowing bar of a finger bar mower of a harvester comprises a finger bar. At least one mowing finger arrangement is mounted on the finger bar. A mowing sickle is reciprocatingly guided relative to the finger bar. The mowing sickle includes sickle blades that are attached on a blade bar and have respectively cutting edges.

Concerning further features of the mowing bar it is referred to printed publication EP 1 551 214 B1. The drawing and disclosure are incorporated by reference.

Rollers are provided on the mowing bar by which the mowing sickle is supported to the rear on the finger bar when viewed in working direction. The rollers are, respectively, rotatably supported on a roller holder. The roller holders are mounted on the finger bar. The roller holders are in the form of bridges between two neighboring mowing fingers.

The mowing finger and the roller holders can be attached by joint attachment screws onto the finger bar. The roller holders are attached, respectively, between two mowing finger arrangements arranged next to each other. The roller holders are attached by attachment screws to both mowing finger arrangements arranged next to each other. Instead of rollers, guide plates can be used with a top guiding roller to guide on the sickle back.

The disclosure is described in more detail using the embodiments shown in the drawings. The embodiments concern the mowing finger arrangement, the mowing bar and the method according to the disclosure at the same time. The embodiments are exemplary and do not limit the general idea of the disclosure.

Further areas of applicability will become apparent from the description provided herein. The description and specific examples in this summary are intended for purposes of illustration only and are not intended to limit the scope of the present disclosure.

DRAWINGS

Preferred embodiments of the disclosure are schematically shown in the drawing wherein:

FIG. 4 is a cross-section view of a detail designated in FIG. 2 within circle IV.

FIG. 5 is a perspective view of the upper element according to FIG. 1 viewed from the lower element.

FIG. 6 is a perspective view of the mowing finger arrangement according to FIG. 2.

FIG. 9 is a longitudinal sectional view of a mowing bar.

FIG. 10 is a top plan view of the mowing bar according to FIG. 9.

DETAILED DESCRIPTION

Figure 1:
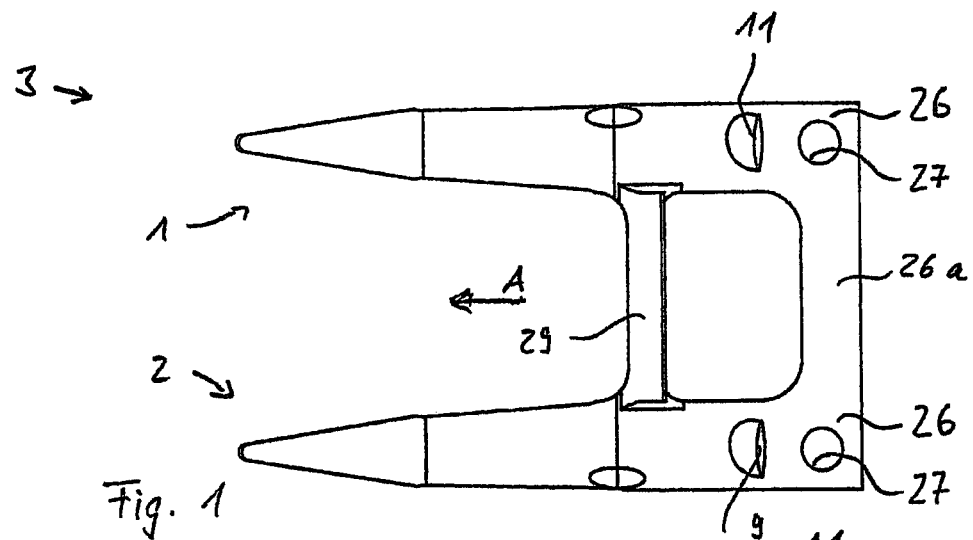
FIG. 1 is a plan view of a bottom side of an upper element of a mowing finger arrangement.
Figure 2:
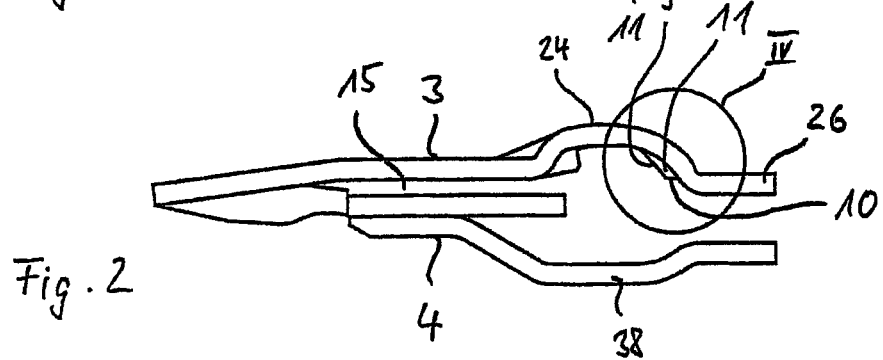
FIG. 2 is a side elevation view of a mowing finger arrangement.
Figure 3:
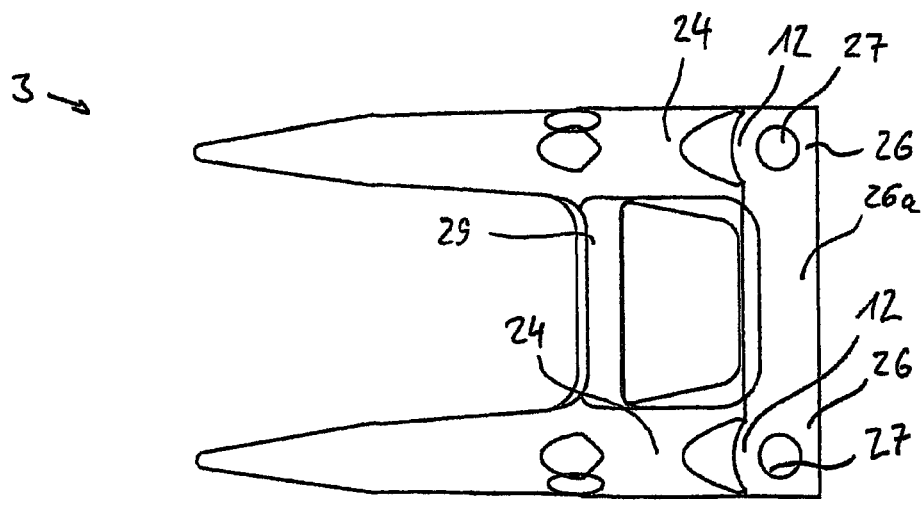
FIG. 3 is a plan view of a top side of the upper element according to FIG. 1.

FIGS. 1 to 3 are described together. FIGS. 1 and 3 illustrate an upper element 3 of a mowing finger arrangement. The upper element 3 is connectable to a lower element 4 according to the mowing finger arrangement in FIG. 2. The mowing finger arrangement, shown in the embodiment, has two mowing fingers 1, 2. The space provided between the upper element 3 and the lower element 4 accommodates the mowing sickle, which is described later with reference to the FIGS. 7 and 8 in more detail. Arrow A represents a working direction that the mowing finger arrangement is moved toward during mowing operation. The working direction A identifies the moving direction of the entire mower during the mowing process.

A portion of the upper element 3 arranged at its rear, when viewed in the working direction A, forms a rear web 26. The rear web 26 serves to attach the mowing finger arrangement onto a not shown mowing bar by means of the bore 27. The webs 26 of the upper elements 3 of the two mowing fingers 1, 2 are connected by a rear connection piece 26a to form a connection web. It is apparent to one skilled in the art, that without such a connection 26a, a mowing finger arrangement with only one mowing finger would be present. This is also considered within scope of the claims as is in the three or more connected mowing fingers in a mowing finger arrangement. Components that are provided once for each mowing finger, are described in singular. The skilled artisan can see that the total number depends on the number of mowing fingers. A front connection web 29 also connects the two mowing fingers 1, 2 at the upper element 3 and forms a portion of the blade gap 15.

A topside bulge 24 is formed in the upper element 3 in front of the rear web 26, when viewed in working direction. The bulge 24 provides a space to accommodate the not shown mowing sickle. The bulge 24 is, thus, concavely formed towards the lower element 4. The term concave only indicates the main direction of the molding of the bulge 24, without limiting it to a geometric shape, like for example spherical, elliptical or rectangular. The lower element 4 has a corresponding downside bulge 38, also formed away from the mowing sickle.

A projection 11 is arranged in the rear part of the upper bulge 24, when viewed in the working direction A. The projection 11 projects in a direction towards the lower element 4 from the bulge 24.

FIG. 4 illustrates an enlarged detail designated within circle IV of FIG. 2. The projection 11 in the topside bulge 24, in the area of the transition to the rear web 26, is shown. The projection 11 has an inclined extending flank 9 and a face 10, facing the mowing sickle. An abutment is formed for the mowing sickle by the face 10 of the projection 11. The abutment face 10 delimits the mowing sickle deflection as will be described later in more detail. Opposite to the projection 11, on the convex side of the bulge 24, a mating impression 12 is arranged on the concave side of the bulge 24. The projection 11 is preferably manufactured by embossing the impression 12 on the convex side of the bulge 24, facing away from the mowing sickle. During the forming process, the pushed-away material escapes to form the projection 11 on the concave side of the bulge 24. As seen in FIGS. 3 and 6, the impression 12 advantageously serves to provide a flat portion around the bore 27. The impression 12 provides sufficient space for a screw bolt or a screw nut.

In FIG. 5, the upper element 3 is shown in a perspective view from its side facing the lower element. The position of the rear web 26, the topside bulge 24 with the projection 11 and the front connection web 29 are visible.

FIG. 6 illustrates a perspective view of a mowing finger arrangement according to FIG. 2. An opening is formed between the rear connection web 26 and the front connection web 29 of the upper element 3 and the topside bulge 24. The opening extends into the rear connection web 26 of the upper element 3. Thus, this ensures that the rear connection web 26 of the upper element 3 is not bulged. This could lead to distortions in the forming process. The front connection web 29 of the upper element 3 is approximately arranged parallel to a front connection web 34 of the lower element 4. The front connection web 29 of the upper element 3 is, thus, not bulged. The front connection web 29 of the upper element 3 and the front connection web 34 of the lower element 4 form a gap, that is part of the blade gap 15 (see FIG. 2).

Figure 7:
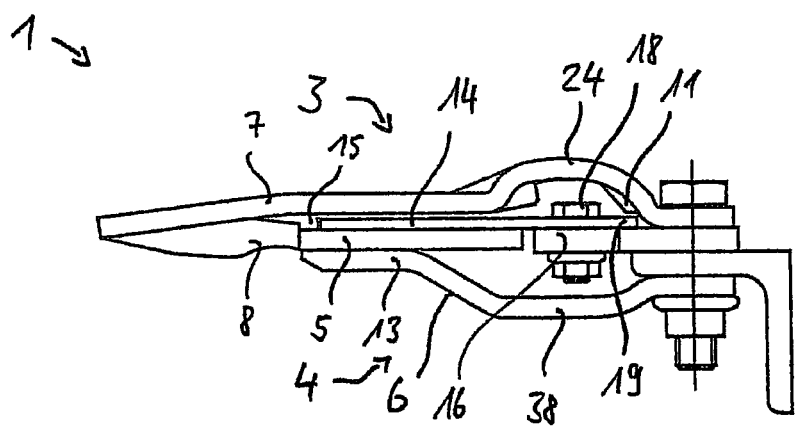
FIG. 7 is a side elevation view of the mowing finger arrangement according to FIG. 2 with a mowing sickle.
Figure 8:
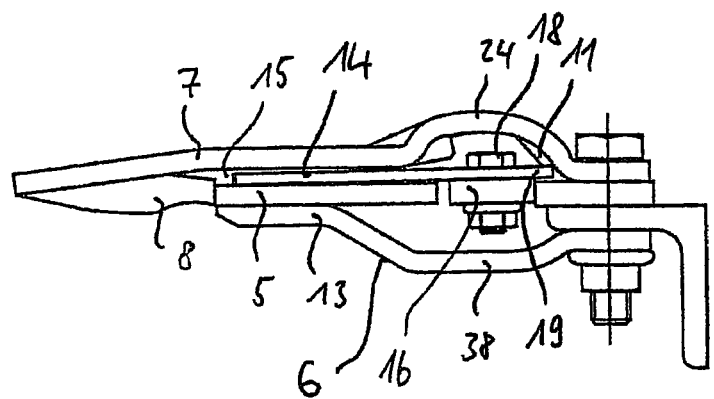
FIG. 8 is a side elevation view of the mowing finger arrangement according to FIG. 7 with the mowing sickle in a position deflected up to the abutment.

In FIG. 7 the mowing finger arrangement according to FIG. 2 is shown with a mowing sickle 16 in a neutral, non loaded position. In FIG. 8, the mowing finger arrangement according to FIG. 7 is shown with the mowing sickle 16 in a position deflected up to the abutment 11.

The upper element 3 is preferably formed as a sheet metal stamping. It has an upper finger portion 7. A support plate 5, formed as a stamped piece, is manufactured from sheet metal and has a lower finger portion 8. The upper finger portion 7 and the lower finger portion 8 are connected, preferably welded, to each other at a free end of the mowing finger 1. A carrier 6 has a carrier arm 13 that is rigidly connected, for example, by welding, to the lower finger portion 8. The carrier 6 is, in this case, as the upper element 3, manufactured from a sheet metal piece.

The mowing sickle 16 has a blade 14. A cutting portion of the blade 14 is guided in the blade gap 15. A rear portion 19 of the blade 14, arranged in working direction A behind an attachment mechanism 18, is deflected during mowing operation in direction towards the upper element 3. This occurs when the blade 14 is pulled downward at the front by the cutting forces during the mowing process. Thus, the blade 14 is pulled towards the ground or towards the harvesting goods. Due to this, the rear portion 19 of the blade 14 abuts the projection 11, as shown in FIG. 8. The projection 11, thus, advantageously prevents a downwards tilting of the blade 14 downwards.

FIG. 9 depicts a mowing bar 100 of a finger bar mower of an agricultural machine in a longitudinal sectional view. The mowing bar 100 includes a finger bar 101 with mowing finger arrangements 3 attached onto the finger bar 101 via nuts and bolts 116.

FIG. 10 is a top plan view of the mowing bar 100 according to FIG. 9. FIG. 10 illustrates a mowing sickle including sickle blades 108 attached onto a blade bar 107. The sickle blades 108 have cutting edges 109. The mowing sickle is reciprocatingly guided relative to the finger bar 101. The mowing bar 100 further includes rollers 113 to support the rear of the mowing sickles on the finger bar 101. The roller 113 is rotatably supported on a roller holder 119 on the finger bar 101. The roller holder 119 is formed in the form of a bridge between two neighboring mowing fingers.

The description of the disclosure is merely exemplary in nature and, thus, variations that do not depart from the gist of the disclosure are intended to be within the scope of the disclosure. Such variations are not to be regarded as a departure from the spirit and scope of the disclosure.

What is claimed is:

1. A mowing finger arrangement comprising:
an upper element and a lower element, the upper element having an elongated finger portion with an outer surface and an inner surface facing the lower element, the upper and lower elements are connected to form at least one mowing finger, a blade gap to guide a mowing sickle is formed between the lower element and the upper element; and
a projection is formed by an impression in the outer surface of the upper element elongated finger portion so that pushed away material from the finger portion outer surface impression escapes inward to the inner surface to form the projection that extends from the inner surface of the upper element elongated finger portion towards the lower element, the projection includes an abutment for contacting a rear portion of the mowing sickle, when viewed in a working direction.

2. The mowing finger arrangement according to claim 1, wherein a movement of the rear portion of the mowing sickle, when viewed in the working direction, is delimited by the projection in a direction towards the upper element.

3. The mowing finger arrangement according to claim 1, further comprising a rear web of the upper element is arranged on a rear end of the at least one mowing finger, when viewed in the working direction, the rear web of the upper element serves to attach the mowing finger arrangement on a finger bar and the projection is arranged in front of the rear web, when viewed in the working direction.

4. The mowing finger arrangement according to claim 3, wherein when viewed in the working direction, at least one topside bulge is arranged in front of the rear web, the projection is arranged on a concave side of the topside bulge.

5. The mowing finger arrangement according to claim 4, wherein the rear web of the upper element has an attachment bore, the impression is arranged in an area of the topside bulge facing the attachment bore.

6. The mowing finger arrangement according to claim 1, wherein the upper element and the lower element form two mowing fingers.

7. The mowing finger arrangement according to claim 6, wherein a rear web of the upper element is formed as a rear connection web of the upper element, the two mowing fingers are connected to each other via the rear connection web and a front connection web on the upper element as well as via a rear connection web and a front connection web on the lower element.

8. A method for producing a mowing finger comprising the steps of:
embossing an upper element with the upper element having an elongated finger portion with an outer surface and an inner surface facing a lower element;
forming an impression on the outer surface;
forming a projection under the impression by deforming the upper element elongated finger portion outer surface so that pushed away material from the finger portion outer surface impression escapes inward to the inner surface to form the projection that extends from the inner surface in a direction towards the lower element;
forming an abutment for contacting a rear portion of a mowing sickle, when viewed in a working direction; and
connecting the upper element to the lower element.

9. The method according to claim 8, forming the projection by an impression on the outer surface of the upper element elongated finger portion facing away from the lower element.

10. The method according to claim 8, wherein, during the embossing of the upper element, forming a rear web on a rear end of the mowing finger, when viewed in the working direction, and forming a topside bulge, arranged in front, of the projection formed on a concave side of the topside bulge.

11. The method according to claim 10, further comprising impressing the projection on a concave side of the topside bulge, and forming a space around an attachment bore of the rear web.

12. The method according to claim 8, wherein the embossing of the upper element and the forming of the projection are carried out in one working step.

13. A mowing bar of a finger bar mower of an agricultural machine comprising:
a finger bar;
at lease one mowing finger arrangement according to claim 1 attached Onto the finger bar;
a mowing sickle including sickle blades attached onto a blade bar, the sickle blades have cutting edges; and
the mowing sickle is reciprocatingly guided relative to the finger bar.

14. A mowing finger arrangement comprising:
an upper element and a lower element, the upper element having an elongated finger portion with an outer surface and an inner surface facing the lower element, the upper and lower elements are connected to form at least one mowing finger, a blade gap to guide a mowing sickle is formed between the lower element and the upper element; and
a projection is formed by an impression in the outer surface of the upper element elongated finger portion that extends from the upper surface between side edges of the upper element elongated finger portion, and so that pushed away material from the finger portion outer surface impression escapes inward to the inner surface to form the projection that extends from the inner surface of the upper element elongated finger portion, between the side edges of the upper element elongated finger portion, towards the lower element, the projection includes an abutment for contacting a rear portion of the mowing sickle, when viewed in a working direction.

* * * * *

UNITED STATES PATENT AND TRADEMARK OFFICE
CERTIFICATE OF CORRECTION

PATENT NO. : 8,806,845 B2  
APPLICATION NO. : 13/049938  
DATED : August 19, 2014  
INVENTOR(S) : Gustav Schumacher et al.

Page 1 of 1

It is certified that error appears in the above-identified patent and that said Letters Patent is hereby corrected as shown below:

In the Claims

<u>Column 8</u>  
Line 28, claim 13     "lease" should be --least--  
Line 29, claim 13     "Onto" should be --onto--

Signed and Sealed this  
Sixth Day of January, 2015

Michelle K. Lee  
*Deputy Director of the United States Patent and Trademark Office*